(12) United States Patent
Souvlos et al.

(10) Patent No.: US 7,730,663 B2
(45) Date of Patent: Jun. 8, 2010

(54) ROTARY PLANT GROWING APPARATUS

(76) Inventors: Angelo Souvlos, 175, Marcotte, St-Laurent, Quebec (CA) H4N 1A5; Costa Sacaretsanos, 539, Crois des Glaieuls, Laval, Quebec (CA) H7X 3H2; Terry Zouboulakis, 4620 Beauchesne, Laval, Quebec (CA) H7T 2T6

( * ) Notice: Subject to any disclaimer, the term of this patent is extended or adjusted under 35 U.S.C. 154(b) by 158 days.

(21) Appl. No.: 12/003,430

(22) Filed: Dec. 26, 2007

(65) Prior Publication Data

US 2009/0165373 A1 Jul. 2, 2009

(51) Int. Cl.
*A01G 31/02* (2006.01)
*A01G 31/06* (2006.01)

(52) U.S. Cl. .................... 47/62 C; 47/62 R; 47/62 N

(58) Field of Classification Search ............ 47/65, 47/66.5, 79, 48.5, 39, 59 R, 60, 61, 62 C, 47/62 E, 62 R, 82, 83; A01G 31/02, 31/06
See application file for complete search history.

(56) References Cited

U.S. PATENT DOCUMENTS

| | | | | |
|---|---|---|---|---|
| 1,281,105 A * | 10/1918 | Unger | ............ | 211/164 |
| 1,728,951 A * | 9/1929 | Appel | ............ | 47/14 |
| 3,659,396 A * | 5/1972 | Baker | ............ | 53/546 |
| 6,604,321 B2 * | 8/2003 | Marchildon | ......... | 47/62 R |
| 6,840,007 B2 | 1/2005 | Leduc et al. | | |
| 2004/0237396 A1 * | 12/2004 | Castillo | .......... | 47/61 |
| 2005/0055878 A1 * | 3/2005 | Dumont | ........ | 47/62 R |
| 2006/0230674 A1 * | 10/2006 | Marchildon | ....... | 47/60 |

* cited by examiner

*Primary Examiner*—Son T Nguyen
*Assistant Examiner*—Marisa Conlon
(74) *Attorney, Agent, or Firm*—Equinox Protection; Franz Bonsang, Patent Agent

(57) ABSTRACT

A rotary plant growing apparatus has a cylindrical structure rotatably mounted on a support base. The cylindrical structure consists of a plurality of baskets in which plants may be grown and rotates around a rotational axis such that the baskets are at least partially immersed in nutrient reservoir containing a liquid nutrient for nourishing the plants. A light source extending at least partially through the cylindrical structure provides light for growth of plants. The baskets are securely and removably attached to rims of the cylindrical structures by pins extending therefrom and which have heads which retaining the pins in apertures therefore on the rims. A motor and gear arrangement provides rotation of the cylindrical structure.

18 Claims, 5 Drawing Sheets

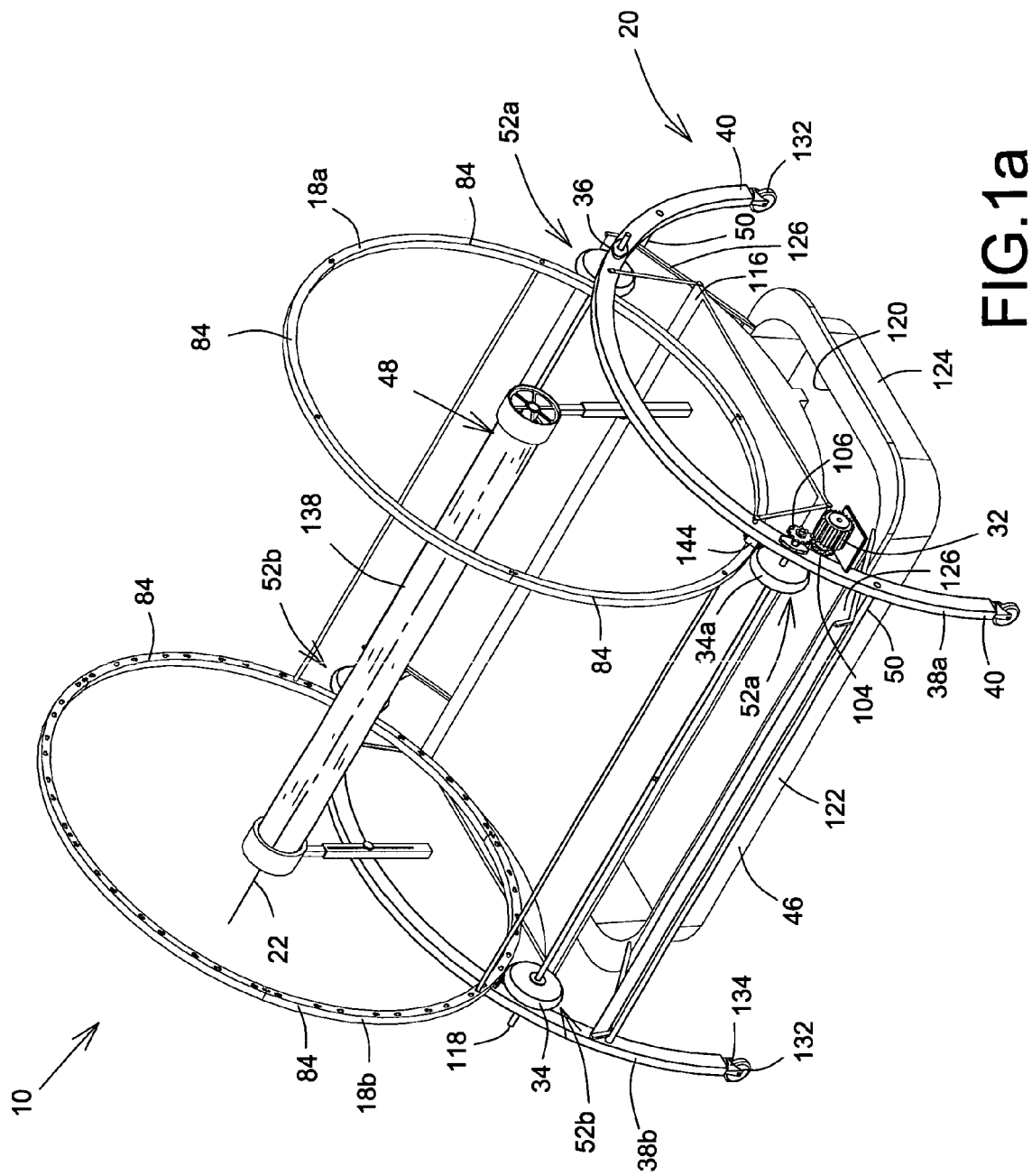

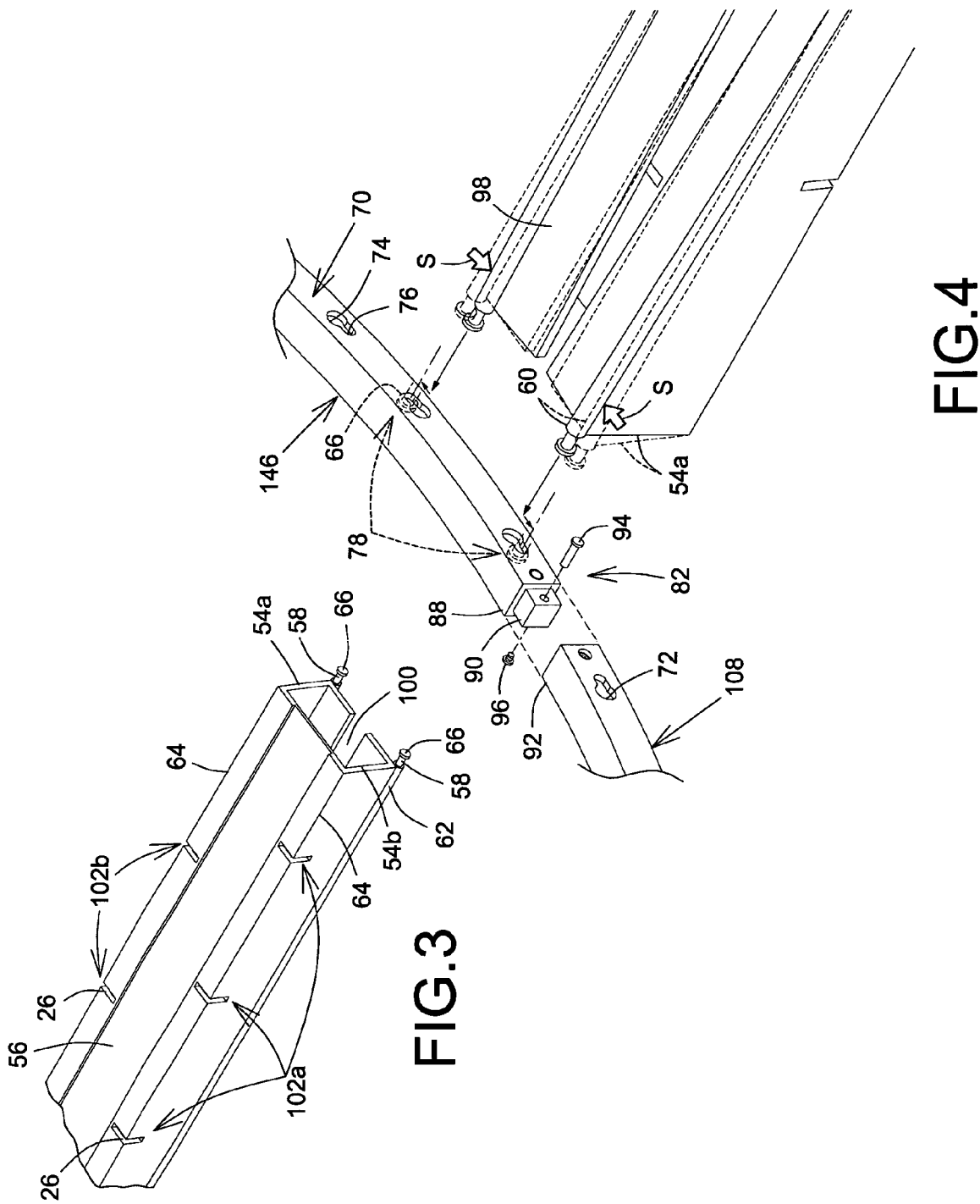

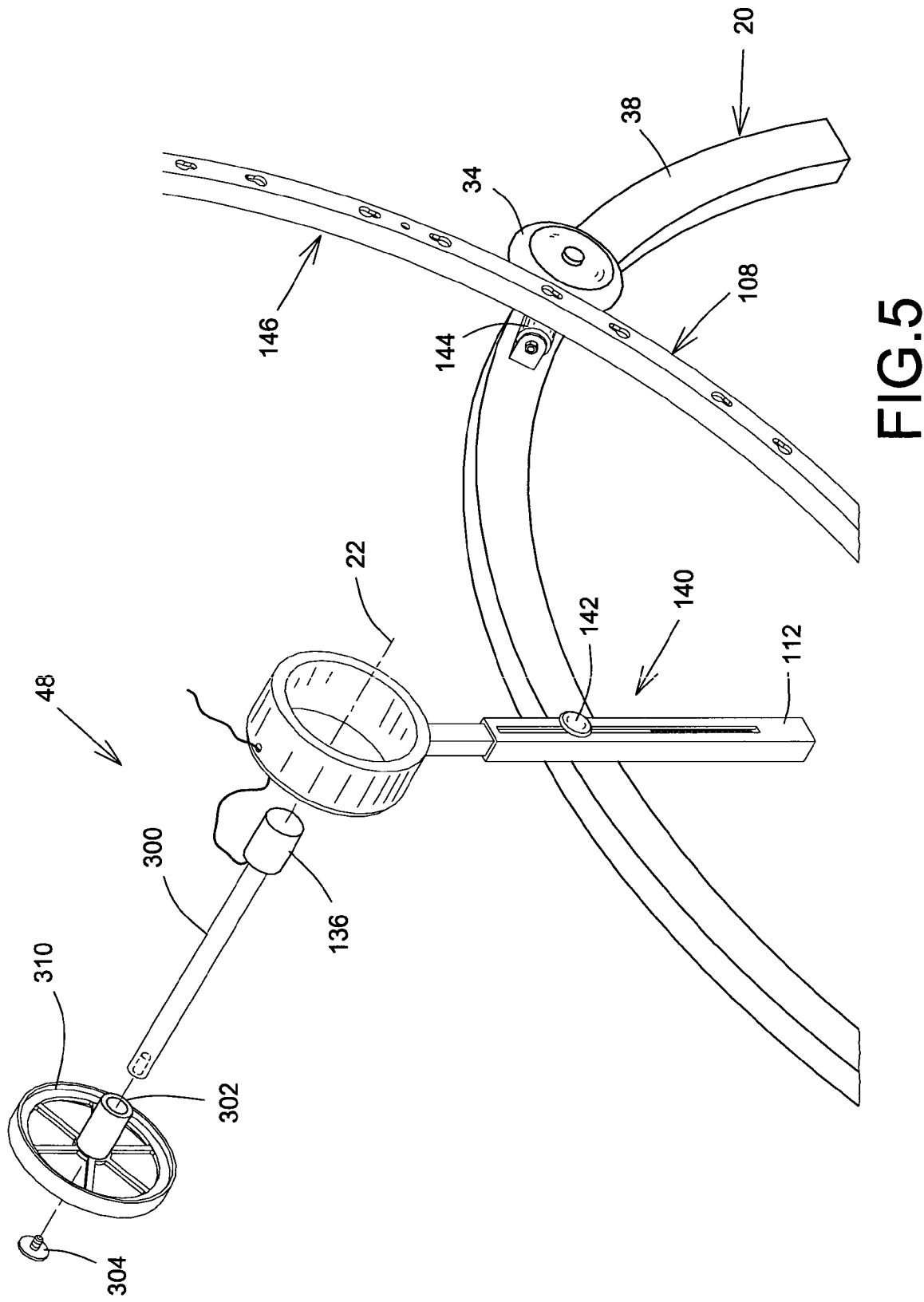

ROTARY PLANT GROWING APPARATUS

FIELD OF THE INVENTION

The present invention relates to plant growing apparatuses and is more particularly concerned with a rotary plant growing apparatus.

BACKGROUND OF THE INVENTION

It is well known in the art to use to use a rotary plant growing apparatus to grow plants in either indoor or outdoor environments. For example, U.S. Pat. No. 6,840,007, issued to Leduc et al. on Jan. 11, 2005, teaches such an apparatus in which a cylindrical structure, comprising a plurality of baskets connected to two generally opposed circular rims in a circumferentially spaced apart configuration, mounted on a support base and which is rotated on the support base about a rotational axis by a wheel in abutting contact therewith and which is rotated by a motor connected thereto by chains, sprockets, and the like. The baskets contain a growing medium which supports growth of the plants and which allows absorption of a liquid nutrient for feeding the plants during growth. The liquid nutrient is stored in a reservoir of liquid disposed on the support base and which is positioned thereon relative the cylindrical structure such that the rotation of the cylindrical structure at least partially immerses each basket in the liquid nutrient in the reservoir as the basket is rotated therethrough with the cylindrical structure. Nutrient apertures in the basket allow for passage of the liquid nutrient therethrough into the growing medium during immersion of the basket therein in the reservoir, thereby providing and refreshing the liquid nutrient to the plants in each basket during each rotation of the cylindrical structure. A light source extending at least partially through the cylindrical structure provides light required for growth of the plants.

Unfortunately, the design of the apparatus of Leduc et al. described above has a number of deficiencies and disadvantages. For example, the cylindrical structure, and notably the bottom walls of the baskets where the nutrient apertures are situated, extend beyond the edges of the nutrient reservoir, i.e. the surface area covered by the reservoir underlying the cylindrical structure is less than the area over which the structure extends. Therefore, there is a significant risk that liquid nutrient may leak out or escape from the basket during rotation and that the escaped liquid nutrient will not fall back into the reservoir. Further, the chain and wheel combination connected to the motor used to drive the rotation of the cylindrical structure is subject to excessive wear, which reduces efficiency of the motor. Further, the cylindrical structure is mounted on a plurality of wheels upon which the rims of the structure vertically rest, with one of the wheels being rotated by the motor to provide rotation of the structure. Finally, the baskets are connected to each rim by pins which extend from ends of the baskets and which are inserted through slots or apertures in the rims, with the pins lying freely within the slots or apertures. Unfortunately, as the pins lie freely in the slots, they are prone to slippage during rotation of the cylindrical structure, which may cause the baskets to wobble or to become detached from the rims.

Accordingly, there is a need for an improved rotary plant growing apparatus that circumvents the aforementioned difficulties.

SUMMARY OF THE INVENTION

It is therefore a general object of the present invention to provide an improved rotary plant growing apparatus.

An advantage of the present invention is that the plant growing apparatus provided thereby has baskets for growing the plants and which are both removable and securely retained in place.

Another advantage of the present invention is that the apparatus, and all components thereof, may be easily leveled with regard to a surface upon which the apparatus is situated.

A further advantage of the present invention is that the mechanism which drives rotation of the baskets is both simple and durable.

Still another advantage of the present invention is that the apertures in the baskets for providing liquid nutrients to the plants are easily punctured therein.

Another advantage of the present invention is that the apparatus may be easily assembled and disassembled.

Still a further advantage of the present invention is that the loss of liquid nutrient for the plant from the baskets during rotation thereof is minimized.

In a first aspect of the present invention, there is provided a rotary plant growing apparatus comprising:

a support base comprising at least one motor and a nutrient reservoir for containing a nutrient liquid; and a cylindrical structure mounted on the support base and operatively connected to the motor, the cylindrical structure comprising first and second circularly shaped rims and at least one basket extending from the first circular rim to the second circular rim for housing a growing medium and plants in the growing medium, the basket comprising two basket side walls extending between first and second basket ends thereof with one of the basket side walls being a resilient side wall, each basket end having a pair of pins, one the pins of each pair extending from each basket side wall, each pin having a head flange extending radially outwardly therefrom and therearound, the pin being inset from the head flange, each rim having, for each pair of pins, a pair of respective apertures, one respective aperture for each pin, formed within and completely enclosed by a respective rim inner wall thereof and accessible only from the respective rim inner wall, the respective apertures having proximally situated first portions and smaller, distally situated second portions of smaller dimension than the head flanges, and thereby configured for blocking passage of the head flanges therethrough, each pin extending through the respective aperture with the respective aperture situated between the basket side wall and the head flange and being resiliently biased by the resilient side wall through the second portion with the head flange extending thereover and thereby attaching the basket to the rim with the rim inner wall in snug and abutting contact on one side thereof with the head flange and on the other side thereof with the side wall and thereby limiting lateral movement of the basket between the rims and wobbling of the basket, the motor rotating the cylindrical structure about a rotational axis to at least partially immerse the basket in the nutrient liquid in the reservoir to nourish the plants.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 1a is a partial top perspective view showing a base of the plant growing apparatus shown in FIG. 1;

FIG. 3 is a partial perspective view of a basket for the plant growing apparatus shown in FIG. 1;

FIG. 4 is a partial exploded view of the apparatus shown in FIG. 1, illustrating the basket and a rim of a cylindrical structure thereof; and FIG. 5 is a partial perspective view of the apparatus shown in FIG. 1, showing a stabilizer wheel for the rim of the cylindrical structure.

DETAILED DESCRIPTION OF THE PREFERRED EMBODIMENT

With reference to the annexed drawings the preferred embodiments of the present invention will be herein described for indicative purpose and by no means as of limitation.

Figure 1:
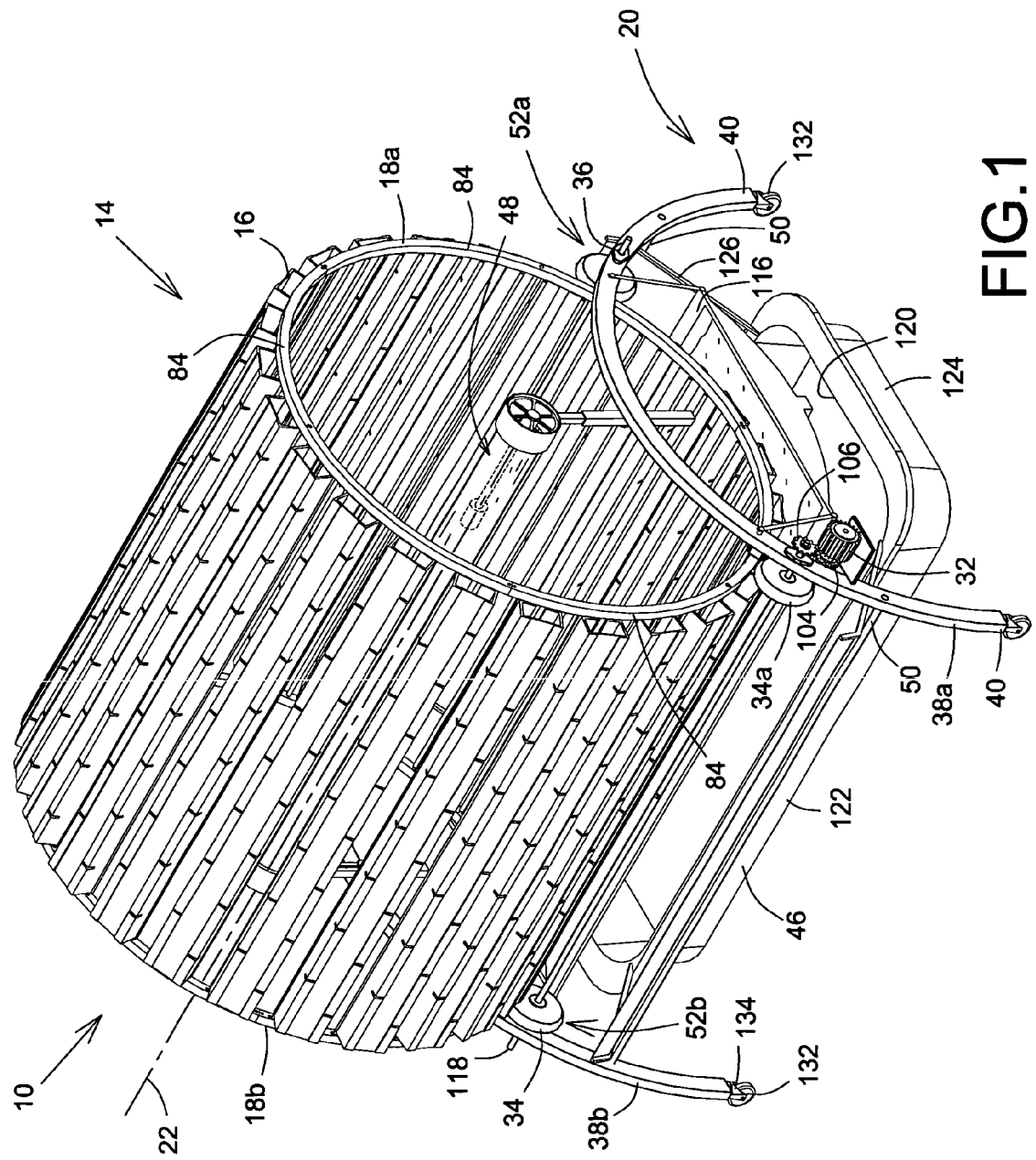
FIG. 1 is a top perspective view of an embodiment of a rotary plant growing apparatus in accordance with the present invention.
Figure 2:
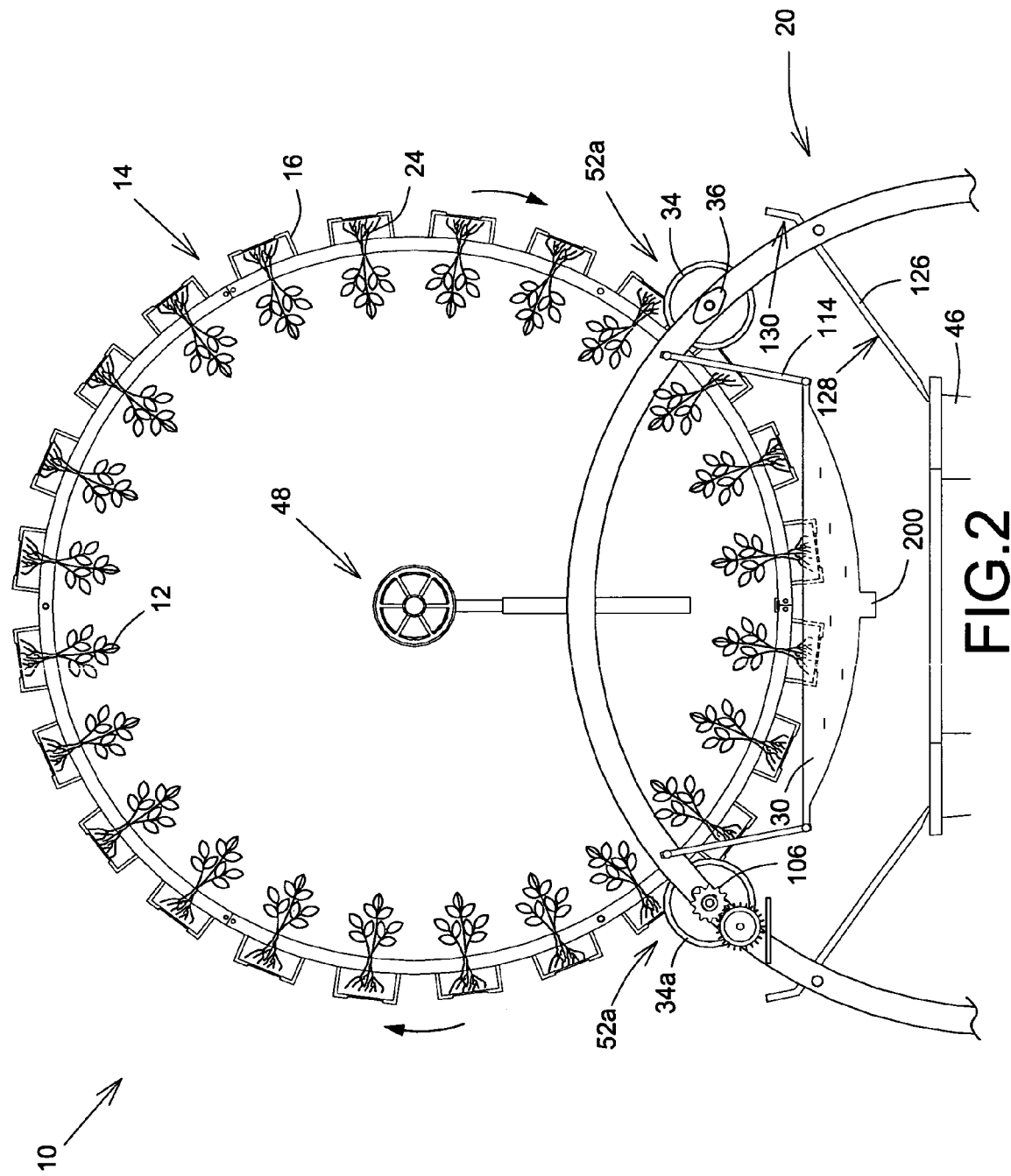
FIG. 2 is a side plan view of the plant growing apparatus shown in FIG. 1.

Referring now to FIGS. 1, 1a, and 2, there is shown an embodiment of a rotary plant growing apparatus, shown generally as 10, for growing plants 12. Generally speaking, the apparatus 10 has a support base, shown generally as 20, and a cylindrical structure, shown generally as 14, having generally circular first and second rims 18a, 18b and at least one basket 16 extending therebetween and attached thereto, rotatably mounted on the support base 20 for rotation about a rotational axis 22. The basket 16 contains a growing medium 24, such as earth, peat moss, or any other medium capable of supporting and sustaining the growth of at least one plant planted or otherwise placed in the growing medium 24 in the basket 16. In order to provide nutrients, such as water and fertilizer, for growth of the plant 12, the base 20 has a nutrient reservoir 28 which contains a nutrient liquid 30 containing for example, water, fertilizer, a combination thereof, or the like. The basket 16, in turn, has at least one nutrient slit or aperture 26 which allows for passage therethrough of the liquid nutrient 30 into the plant growing medium 24 for nourishing the plant 12. Preferably, and as shown, each basket 16 has a plurality of plants 12 planted spaced apart therein between first and second basket ends 44a, 44b. The cylindrical structure 14, in turn, preferably has a plurality of baskets 16 extending between, and connected to, the rims 18 in a circumferentially spaced apart relationship in which the baskets 16 are connected to the rims 18 circumferentially spaced apart thereon relative one another.

The cylindrical structure 14 is rotatably mounted on the base 14 by resting of the rims 18 on first and second wheel pairs 52 of rotatable mount wheels 34 rotatably mounted on, respectively end racks 38a, 38b of the base 20 in a bearing and axle arrangement 36, preferably equidistant a proximal rack end or foot 40 of the rack 38. The end racks 38 are, in turn, connected by cross members 50 extending therebetween substantially parallel one another from a position on the rack 38 substantially equidistant the rack end 40 to which each cross member 50 is most proximally situated. At least one mount wheel 34 is a drive mount wheel 34, for example 34a, connected to a respective motor 32 therefor, thereby operatively connecting the rim 18 lying thereupon and the cylindrical structure 14 to the motor 32. The motor 32, when actuated, rotates the drive mount wheel 34a which in turn causes the rim 18a resting thereon to rotate, as well as the other rim 18b connected thereto by the baskets 16, thereby rotating the cylindrical structure 14 on the mount wheels 34 around the rotational axis 22. As the cylindrical structure 14 rotates, the basket 16 traverses the nutrient reservoir 28, with the cylindrical structure 13 and nutrient reservoir 28 being configured, for example positioned, such that the basket 14, and notably the nutrient apertures 26, are at least partially immersed therein. Thus, with every rotation of the cylindrical structure 14, the liquid nutrient 30 in the nutrient reservoir 28 passes through the nutrient apertures 26 of each basket 16 as the basket traverses the reservoir 28 and into the growing medium 24 for nourishing the plants 12.

A drain tray 46 mounted on the racks 38 of the support base 20, extends beneath the reservoir 28 over a surface area that extends completely under and completely across the area over which the reservoir 28 and structure 30, including the baskets 14 extend. Accordingly, the drain tray 46 captures any escaped or excess nutrient liquid 30 that may escape, drop, spill or be otherwise be released from a basket 16 when the basket is situated outside of the reservoir 28, as well as escaped nutrient liquid 30 that spills or otherwise drops from the reservoir 28 itself and which is not received in the baskets 18. Thus, the drain tray 46 is configured, i.e. sized shaped, and positioned, to completely underlie the reservoir 28 and cylindrical structure 14, including the baskets 16. To provide illumination, where and when required, an optional light source 48, mounted on at least one of, and preferably both, the end racks 38, extends at least partially, and preferably completely, through the cylindrical structure 14, preferably in axial alignment with the rotational axis 22, preferably at the centre of the structure 14. The light source 48 is mounted on the end rack 38 by an adjustable and telescopically extendable respective light mounting member 112 connected to the end rack 38.

Having generally described the structure and function of the apparatus 10, the components thereof will now be described in greater detail. Referring now to FIGS. 1, 1a, 2, 3, and 4, each basket 16 includes first and second basket side walls 54a, 54b. At least one side wall 54a, and preferably both side walls 54, is a resilient side wall 54 constructed of flexible and resilient material, preferably impermeable to the liquid nutrient 30. The basket side walls 54 extend between first and second basket ends 44a, 44b of the basket 16, along with a basket bottom wall 56 which depends therefrom and coextends therewith, from the first basket side wall 54a to the second basket side wall 54b, between the basket ends 44 and which generally faces outwardly away from the structure 14 when the basket 16 is attached to the rims 18. The bottom basket wall 56 may, optionally, also be made of the resilient and flexible material.

For connecting, i.e. attaching, the basket 16 to the rims 18, each basket 16 has a first and second pair of, preferably circular, pins 58, one pair of pins 58 being situated at each basket end 44. Each pin 58 extends axially from a basket side wall 54, i.e. in axial alignment therewith, from the end 44. Preferably, each pin 58 is mounted in a tube 60, preferably circular, situated proximally adjacent the end 44 and extending axially along the basket side wall 54, preferably in proximity to a top edge 62 thereof situated generally opposite a bottom corner 64, or intersection, between the basket side wall 54 and the basket bottom wall 56. The pins 58 may be hollow and may be mounted resiliently and telescopically, in the tubes 60. Each pin 58, preferably in proximity to the pin end, has a respective head 66, i.e. a respective head flange 66. extending radially outwardly and preferably perpendicularly, therefrom and circumferentially therearound, the pin 58 being thereby inset relative the respective head 66. For each pair of pins 58, each rim 18 has, on a rim inner wall 70 facing the baskets 32, a pair of respective or corresponding pin apertures 72, formed within and completely enclosed by the wall 70 and, thereby, accessible only therefrom. The pin apertures 72 of each pair have proximally situated first portions, with the first portion 74 of the first pin aperture 72a of each pair being situated proximal the first portion 74 of the second pin aperture 72b of the pair, and distally situated second portions 76. The apertures 72, pins 58, and head flanges 66 are configured in size, shape, and position, such that, when a basket 16 is connected to the rims 18 in an attached configuration, shown generally as 78, where each pin 58 extends through the corresponding pin aperture 72 with the pin aperture 72 situated between the basket 16 and the head flange 66, with the head flange 66 being resiliently biased by the action of resilient basket side wall 54 into axial alignment and extending over and across the second portion 76 of the respective aperture 72. The head flange 66 is of smaller dimension, and notably area, than the second portion 76 and is therefor configured, i.e. sized and shaped, to prevent passage thereof through the second portion 76. As the head flange 66 over the second portion 76 in the attached configuration 78, the head flange 66, and therefore the pin 58, may not be withdrawn through the aperture 72 and the basket 16 is securely attached and retained to the rim 18. Further, the pins 58, head flanges 66, and walls are 54, 70 are, preferably, configured such that when the basket 16 is attached to the rim 18 in the attached configuration 78, the inner wall 70 of the rim is in snug and abutting contact on one side thereof with the head flange 66 of each pin 58 and, on the other side, the side wall 70, thus stabilizing the basket 16 by limiting lateral movement thereof between the rims 18 and wobbling of the basket 14.

Conveniently and advantageously, the head flange 66, the pin 58, and the first and second portions 74, 76 are sized and shaped for free unobstructed passage of the head flange 66 and pin 58 through the first portion 74 when the head flange 66 is axially aligned therewith. Thus, the head flanges 66 and pins 58 may be freely inserted and retracted through the first portions 74 of their respective apertures 72 by flexion of one of basket side walls, for example 54a, towards the other basket side wall 54b by application of an inwardly directed force, shown by arrows S in FIG. 4, to axially align the head flanges 66 with the first portion 74 for inserting or withdrawing the head flanges 66 and pins 58 therethrough. When the head flanges 66 are inserted through the first portions 74 and the inwardly directed force is released, the subsequent resilient biasing of the pin 58 moves the pin 58 into the attached configuration 78. Similarly, the basket 16 is removable by applying the inwardly directed force on one of the side walls 54 to flexingly move the pins 58 out of the attached configuration 78, in which the pins 54 and head flanges 66 are aligned with the second portion 76, into alignment with the first portions 74 and withdrawing the head flanges 66 through the first portions 74. Accordingly, the basket 16 is easily both removable, i.e. detachable, and attachable to the rims 18, which facilitates assembly and disassembly of the cylindrical structure 14, for example for purposes of storage, transport, and packaging. Preferably, to reduce mass of the apparatus 10, the rims 18 and racks 38 are hollow.

To further facilitate storage, packaging, and transport of the cylindrical structure 14, the rims 18 may, optionally, be assembled from a plurality of curved rim sections 84 attached to one another by attachment means, shown generally as 82 in FIG. 4, and which are circularly shape, forming the circular rim 18, when attached together. For example, and as shown in FIGS. 1 and 3, a rim 18 could have three sections 84, with an indented section end 86 thereof having, as attachment means 84, an indented protrusion 90 adapted for mating insertion into a hollow section end 92 of another section 84 for attachment therein with a hollow retaining member 94 inserted through aligned attachment apertures in the ends 88, 92 and retained in the apertures by a retaining cap 96 insertable into the retaining member 94. However, any attachment means capable of securely attaching the sections 84 together may be deployed. The end racks 38 are, preferably, also semicircular in shape, with each rack 38 extending along a generally semicircular arc between the rack ends 40. The rims 18 and end racks 38 are constructed of a light and durable material, for example precision machined aluminum.

Referring again to FIGS. 3 and 4, to facilitate retention of the plants 12 in the baskets 16, each basket 16 preferably has at least one retaining lip or flange 98 extending radially from one basket side wall 54 at least partially over the basket bottom wall 56 towards the other basket side wall 54 of the basket 16. Ideally, there are two such retaining flanges 98, one extending from each side wall 54 from the first basket end 44a to the second basket end 44b and defining a access channel 100 extending therebetween through which plants 12 may be tended to as required. The baskets 16 are, preferably, made of a durable, yet resilient plastic resistant to ultraviolet light.

Referring still to FIGS. 3 and 4, the nutrient apertures 26, of which each basket 16 preferably has at least one, are preferably situated on the bottom corners 64 and extend partially across the basket bottom wall 56 and the basket side wall 54 defining the corner 64. Preferably, each nutrient aperture 26 is in the form of a slit 26. The use of the slit form for the nutrient apertures 26 allows the nutrient apertures 26 to be easily cut or punched into the baskets 16. Preferably, and to facilitate equal distribution and drainage of the liquid nutrient 30, there are a plurality of spaced-apart nutrient apertures 26 on each intersection 64 forming first and second sets, shown generally as 102a and 102b, of nutrient apertures 26, one set 102 extending along each corner 64. Optionally, but preferably, the nutrient apertures 26 of the first set 102a and the second set 102b are offset relative one an another between the basket ends 44, such that the nutrient apertures 26 of the first set 102a and nutrient apertures 26 of the second set 102b are disposed between the first and second basket ends 44 in an alternating spaced apart-relationship where adjacent nutrient apertures 26 of one set 102a have a nutrient aperture 26 of the other set 102b disposed therebetween on the opposing corner bottom 64.

At least one mount wheel 34 is a drive mount wheel, for example 34a, connected to a respective motor 32 therefor, thereby operatively connecting the rim 18 lying thereupon and the cylindrical structure 14 to the motor 32. The motor 32, when actuated, rotates the drive mount wheel 34a, which in turn causes the rim 18 resting thereon to rotate, as well as the other rim 18 connected thereto by the basket 16, thereby rotating the cylindrical structure 14 on the mount wheels 34 around the rotational axis 22. As the cylindrical structure 14 rotates, the basket 16 traverses the nutrient reservoir 28, with the cylindrical structure and nutrient reservoir being configured, i.e. positioned, such that at least a portion of the basket 14, and notably the nutrient apertures 26, are at least partially immersed therein.

Referring now to FIGS. 1 and 2, the motor 32 is operatively connected to the drive mount wheel 34a by a drive gear 104 connected to the motor 32 and a drive wheel gear 106 connected to the drive gear 104 and to the drive mount wheel 34a by the bearing and axle arrangement 36 thereof. The motor 14, when activated, rotates the drive gear 104 which, in turn, rotates the drive wheel gear 106 which causes the drive mount wheel 34*a* to rotate. As the rims 18 of the cylindrical structure 14, notably the outer circumferential walls thereof 108, are mounted on the drive wheels 34 in abutment therewith, the rotation of drive wheel 34*a* causes the cylindrical structure 14 to rotate. Thus, rotation of the cylindrical structure 14 for the apparatus 10 is provided by use of the gears 104, 106, which reduces problems related to wear of belts, chains and sprockets or the like. Further, the gears 104, 106 in combination with the motor 32 typically provides greater torque than use of belts, chains, and sprockets. The motor 32, preferably mounted on the base 20 on one of the end racks 38, may be of any sort capable of driving rotation of the structure 14. It should be noted that, if desired and as shown in FIG. 1, mount wheels 34 of different wheel pairs 52 may be axially aligned and connected by a common axle 118, as part of the axle and bearing arrangement 36, extending therebetween from one end rack 38*a* to the other end rack 38*b* and around which the mount wheels 34 rotate.

Referring still to FIGS. 1 and 2, the nutrient reservoir 28 is mounted on the end racks 38, and preferably suspended therefrom, by, preferably identical, reservoir connector members 114, each reservoir connector member 114 being preferably identical and connected to the rack 38 at a position thereon substantially equidistant the rack end 40 situated most proximal thereto. However, other configurations for mounting the nutrient reservoir 28 on the base 20 may be envisaged, provided the reservoir 28 is disposed substantially equidistant, i.e. substantially level with regard to, the rack ends 40. To minimize space used by the reservoir 28, and to facilitate shipping, packaging, and storage thereof with the cylindrical structure 14, or rim sections 84 thereof, the reservoir 14 curves downwardly from reservoir side edges 116 thereof in an arc approximating the curvature of the cylindrical structure 14, and notably the rims 18 thereof, towards a centrally situated portion 200. The reservoir side edges 118 extend in general axial alignment with the baskets 16, notably the basket side walls 44 thereof.

The drain tray 46 is removably mounted, i.e. and preferably seated, on the base 20, preferably on the cross members 50 thereof. The drain tray 46 has a drain basin 120 towards which escaped liquid nutrient 30 that escapes from the reservoir 28 or baskets 16 is directed by gravity. The drain basin 120 has generally opposed first and second basin side walls 122 connected to generally opposed first and second basin end walls 124, the basin side walls 122 extending longitudinally beyond the first and second rims 18. The first and second basin side walls 122 each have, in turn, a respective guide wall 126 extending along at least a portion thereof covering, at least, the length of the baskets 18. The guide walls 126, which preferably lay on the cross members 50 to seat the drain tray 46 on the base 20, slant upwardly away from the basin side walls 122. Accordingly, the basin 120 depends from the guide walls 126 when seated on the base 20 and the guide walls 120 guide escaped nutrient liquid 30 from the baskets 14 or reservoir 28 received thereon towards the basin 120 by action of gravitational force. The effect of the gravitational force and movement of the escaped liquid nutrient 30 towards the basin 120 also biases the basin 120 and tray 46 towards a central position between the cross members 50. Preferably, each guide wall 126 is comprised of a first guide wall section 128 and a second guide wall section 130. The first guide wall section 128 extends proximally the basin 120 and slants upwardly away therefrom at a first angular inclination whereas, the second guide wall section 130 extends, and more specifically slants, upwardly away the first guide wall 128 at a second angular inclination greater than the first angular inclination.

The rack ends 40 of each rack 38 are situated generally opposite one another, with all of the rack ends 38 being substantially vertically aligned with one an other when connected by the cross members 50. Each rack end 40 preferably has a support wheel 132 adjustably mounted therein such that the distance between the end 40 and the wheel 132, and thereby a surface upon which the wheels 132, may be adjusted. The apparatus 10 is, preferably, supported on the surface, not shown, by the support wheels 132, which permit displacement of the apparatus on the surface by rolling the apparatus 10 on the support wheels 132. The support wheels 132 are adjustably mounted in the rack ends 40 with conventional and adjustable wheel mounts 134, well known in the art.

As the rack ends 38 are vertically aligned with one another, the cross members 50 and mount wheels 34 are positioned substantially equidistant their respective proximal rack ends 40, and the drain tray 46 and reservoir 28 are configured, notably positioned, to be substantially level relative the rack ends 40, the entire apparatus 10 can be leveled at once relative a surface upon which the apparatus is supported by the support wheels 132, by adjusting the position of support wheels 132. Specifically, by adjusting the distance between each support wheel 132 relative the rack end 40 in which it is mounted, the distance between each rack end 40 and the surface can be adjusted to level the apparatus 10 relative thereto.

The light source 48 consists of at least one light bulb 136 mounted in a highly reflective tempered glass tube 138, mounted on the light mounting member 112. Each light mounting member 112 is mounted on the rack 48 with a pin and slot arrangement, shown generally as 140, which allows for telescopic adjustment of the position of the light source 48. As will be apparent to one skilled in the art, where the light source 48, and notably the tube 138, is connected to two members 112, one mounted on each rack 38, both members 112 will have to be adjusted to reposition the light source 48. Each light bulb 136 is mounted on a rod 300 which is in turn slidably mounted in a bushing arrangement 302 of an end insert 310 connected to the tube 138 and light mounting member 112. Accordingly, the light bulb 138 may be horizontally displaced in the tube 138, in general axial alignment with axis 22, by sliding the rod 300 back and forth through the bushing arrangement 302. A retainer cap 304, sized and shaped such that it may not pass into the bushing arrangement 302, is connected to the rod 300, generally opposite the light bulb 300, and prevents the rod from becoming disengaged from the bushing arrangement 302. As shown in FIG. 1*a*, there are preferably two light bulbs 136 and two bushing arrangements 302, each mounted on light mounting members 112 on opposite sides of the tube 138.

To further inhibit lateral motion and wobbling of the cylindrical structure between the racks 38, each rack 38 has at least one stabilizer wheel 144 mounted thereon, and preferably a plurality of stabilizer wheels 144. Each stabilizer wheel 144 is configured, for example sized, shaped, and positioned, such that a portion of each outer rim wall 146, situated opposite the rim inner wall 70 of the rim 18, abuttingly contacts the stabilizer wheel 144 when the cylindrical structure 14 is mounted on the base 20. As the cylindrical structure 14 rotates, a portion of the outer rim wall 70 of each rim 18 contacts the stabilizer wheels 40, which limits lateral motion of the structure 14 between the rims 18 and impedes abutment with the rims 18. Accordingly, the stabilizer wheel 144 horizontally stabilizes the cylindrical structure 14 and reduces wear on the rims 18 and the racks 38. Ideally, the respective stabilizer wheels 144 on each rack 38 are situated directly across from one another, preferably in proximity to the mount wheels 38.

The description provided herein is provided for purposes of illustration and not limitation. While a specific embodiment has been described, those skilled in the art will recognize many alterations that could be made within the spirit of the invention, which is defined solely according to the following claims.

We claim:

1. A rotary plant growing apparatus comprising:
a support base comprising at least one motor and a nutrient reservoir for containing a nutrient liquid; and
a cylindrical structure mounted on said support base and operatively connected to said motor, said cylindrical structure comprising first and second circularly shaped rims and at least one basket extending from said first circular rim to said second circular rim for housing a growing medium and plants in said growing medium, said basket comprising two basket side walls extending between first and second basket ends thereof with one of said basket side walls being a resilient side wall, each basket end having a pair of pins, one said pin of each pair extending from each basket side wall, each pin having a head flange extending radially outwardly therefrom and therearound, the pin being inset from said head flange, each rim having, for each pair of pins, a pair of respective apertures, one respective aperture for each pin, formed within and completely enclosed by a respective rim inner wall thereof and accessible only from said respective rim inner wall, said respective apertures having proximally situated first portions and smaller, distally situated second portions of smaller dimension than said head flanges, and thereby configured for blocking passage of said head flanges therethrough, each pin extending through said respective aperture with said respective aperture situated between said basket side wall and said head flange and being resiliently biased by said resilient side wall through said second portion with said head flange extending thereover and attaching said basket to said rim with said rim inner wall in snug and abutting contact on one side thereof with said head flange and on the other side thereof with the side wall and thereby limiting lateral movement of said basket between said rims and wobbling of said basket, said motor rotating said cylindrical structure about a rotational axis to at least partially immerse said basket in said nutrient liquid in said reservoir to nourish said plants, wherein each basket further comprises a basket bottom wall depending from said basket side walls and coextending therewith from said first basket side wall to said second basket side wall, said basket bottom wall facing generally outwardly away from said structure when said basket is attached to said rims, wherein each basket has at least one nutrient aperture, each nutrient aperture extending partially across said basket bottom wall and one of said basket side walls at a bottom corner defined by an intersection thereof, wherein said at least one nutrient aperture comprises first and second sets of nutrient apertures, said first set thereof extending across a first bottom corner defined by one said basket side wall and basket bottom wall, and said second set thereof extending across a second bottom corner at the respective intersection between the other said second basket side wall and said basket bottom wall, wherein said support base further comprises a removable drain tray, said drain tray being extending below said reservoir and completely underlying said cylindrical structure and said reservoir for receiving escaped liquid nutrient from said nutrient reservoir and said basket, wherein said drain tray comprises a central drain basin for holding said escaped nutrient liquid, said drain basin having generally opposed first and second basin side walls and first and second basin end walls connected thereto, said basin side walls extending in axial alignment with said basket side walls and beyond said first and second rims, wherein said first and second basin side walls each have a respective guide wall extending along a portion thereof and slanting upwardly therefrom for guiding said escaped liquid nutrient towards said drain basin, said drain basin being centrally situated between said guide walls, wherein each said guide wall is comprised of a first section and a second section, said first section extending proximally to said basin and slanting upwardly at a first angular inclination, said second section extending from said first section and distal said basin and slanting upwardly from said first section at a second angular inclination greater than said first angular inclination.

2. The apparatus of claim 1, wherein said pin and said head flange thereof are sized and shaped for free passage through said first portion of said respective aperture.

3. The apparatus of claim 2, wherein said pins, said apertures, and said basket side walls are configured for insertion of said head flanges through said first portions of said respective apertures by flexion of said resilient side wall, by application of an inwardly directed force thereto, of said basket towards another said basket side wall thereof to align said head flanges with said first portions for passage therethrough, thereby enabling removal of said basket from said rims.

4. The apparatus of claim 1, wherein both said basket side walls are resilient side walls.

5. The apparatus of claim 1, wherein each rim is comprised of a plurality of curved rim sections attached to one another by an attachment means, said curved rim sections being sized and shaped to form a generally circular shape when attached to one another.

6. The apparatus of claim 1, wherein said pins are resiliently and telescopically mounted in tubes extending along side basket side walls in proximity to said basket ends.

7. The apparatus of claim 1, wherein each pin extend axially from said basket side wall in proximity to a top edge thereof situated generally opposite a bottom corner defined by an intersection between said basket side wall and said basket bottom wall.

8. The apparatus of claim 1, wherein each basket has at least one retaining flange extending radially from one said basket side wall towards the other said basket side wall, said retaining flange extending over at least a portion of said basket bottom wall for retaining said plants and said growing medium in said basket.

9. The apparatus of claim 1, wherein said nutrient apertures of said first set are disposed in alternating spaced-apart relationship with said nutrient apertures of said second set.

10. The apparatus of claim 1, wherein said support base further comprises first and second pairs of rotatable mount wheels, situated generally opposite one another, upon which said first and second rims are respectively mounted, a drive mount wheel of said first pair of rotatable mount wheels being connected to said motor and abutting said first rim for rotation by said motor and causing rotation of said cylindrical structure.

11. The apparatus of claim 10, wherein said support base further comprises a drive gear connected to said motor and a drive wheel gear connected to said drive mount wheel and to said drive gear, said motor rotating said drive gear for rotating of said wheel gear and said drive mount wheel for rotating, thereby rotating said cylindrical structure.

12. The apparatus of claim 1, wherein said nutrient reservoir and said cylindrical structure are configured for immersion of said nutrient aperture in said nutrient liquid for absorption of said liquid therethrough into said growing medium when said basket passes through said nutrient reservoir by rotation of said cylindrical structure.

13. The apparatus of claim 1, wherein said reservoir curves downwardly from reservoir side edges thereof, which extend in general axial alignment with said basket side walls, towards a central reservoir portion thereof situated centrally between said reservoir side edges.

14. The apparatus of claim 1, wherein said support base further comprises two generally longitudinally opposed end racks and two elongate cross members extending substantially parallel one another therebetween and connecting said end racks, said reservoir and said rims being mounted on said end racks, said motor being mounted on one of said end racks, said drain tray being removably seated on said cross members, each support rack having two generally opposed rack ends disposed below said drain tray and said side members, each rack end having a support wheel mounted thereon and extending therefrom, said support base, and thereby said apparatus, being supported on a surface thereby.

15. The apparatus of claim 14, wherein said rack ends are in substantially vertical alignment with another, said cross members are positioned equidistant said rack ends, said nutrient reservoir and said drain tray are substantially level relative to said rack ends, and each said support wheel is adjustably mounted in said rack end at an adjustable position relative thereto, a distance between said rack end and said surface being adjustable by adjusting said adjustable position for leveling said apparatus, including said drain tray and said reservoir, relative said surface.

16. The apparatus of claim 14, wherein said end racks are substantially semicircular in shape, each said end rack extending along a semicircular arc between said rack ends.

17. The apparatus of claim 1, wherein said support base further comprises, for each rim, at least one stabilizer wheel positioned for contact with a rim outer wall, extending generally opposite said rim Inner wall, as said rim rotates around said rotational axis.

18. The apparatus of claim 1, further comprising a light source adjustably mounted on said base and extending at least partially through said cylindrical structure for providing light to said plants.

\* \* \* \* \*